United States Patent
Mahajan (10) Patent No.: US 11,340,335 B2
(45) Date of Patent: May 24, 2022

(54) MULTIPLE LIDAR PROCESSING METHODS AND SYSTEMS

(71) Applicant: Byton North America Corporation, Santa Clara, CA (US)

(72) Inventor: Pankaj Mahajan, West Bloomfield, MI (US)

(73) Assignee: Byton North America Corporation, Santa Clara, CA (US)

( * ) Notice: Subject to any disclaimer, the term of this patent is extended or adjusted under 35 U.S.C. 154(b) by 311 days.

(21) Appl. No.: 16/390,179

(22) Filed: Apr. 22, 2019

(65) Prior Publication Data

US 2020/0333439 A1     Oct. 22, 2020

(51) Int. Cl.
*G01S 7/48*     (2006.01)
*G01S 7/497*     (2006.01)
*G01S 17/931*     (2020.01)

(52) U.S. Cl.
CPC ......... *G01S 7/4808* (2013.01); *G01S 7/4802* (2013.01); *G01S 7/497* (2013.01); *G01S 17/931* (2020.01)

(58) Field of Classification Search
CPC ........ G01S 17/86; G01S 17/87; G01S 17/931; G01S 7/4802; G01S 7/4808; G01S 7/497
USPC ....................................................... 702/159
See application file for complete search history.

(56) References Cited

U.S. PATENT DOCUMENTS 10,394,243 B1 * 8/2019 Ramezani ......... B60W 60/0015
10,816,939 B1 * 10/2020 Coleman ................. G01S 17/86
2018/0120439 A1   5/2018 Garde et al.
2020/0166647 A1 * 5/2020 Crouch ................. G01S 7/4815

FOREIGN PATENT DOCUMENTS

| CN | 1721874 A | 1/2006 |
|---|---|---|
| CN | 101987596 A | 3/2011 |
| CN | 103576143 A | 2/2014 |
| CN | 105074497 A | 11/2015 |
| CN | 108369271 A | 8/2018 |

OTHER PUBLICATIONS

The International Search Report for PCT Application No. PCT/CN2020/086207 dated Jul. 28, 2020, 5 pages.
The Written Opinion for PCT Application No. PCT/CN2020/086207 dated Jul. 28, 2020, 4 pages.

* cited by examiner

*Primary Examiner* — John H Le
(74) *Attorney, Agent, or Firm* — Womble Bond Dickinson (US) LLP (57) ABSTRACT

A vehicle that includes at least two LIDAR systems can process data from the two LIDAR systems in an interleaved manner such that data from only one of the two LIDAR systems during a given time period is processed, thereby reducing the computational load on a data processing system in the vehicle. For example, the data processing system can receive and process first LIDAR data captured by a first LIDAR system during a first time period and then receive and process second LIDAR data captured by a second LIDAR system during a second time period that follows the first time period; the data processing system, in one embodiment, does not process data from the second LIDAR system if available and captured by the second LIDAR system during the first time period.

19 Claims, 5 Drawing Sheets

2 LIDAR systems t1 ≠ t2 ≠ t3 ≠ t5

FIG. 5E

3 LIDAR systems

MULTIPLE LIDAR PROCESSING METHODS AND SYSTEMS

BACKGROUND

The field of this disclosure relates to vehicles such as sport utility vehicles (SUVs), cars, trucks, etc.

A recent trend in developments and improvements for vehicles such as automobiles, trucks, SUVs, etc. has been the addition of assisted driving features such as assisted lane changing, assisted cruise control, assisted parallel parking, etc. These additions often use one or more sensors on the vehicles, such as ultrasonic sensors, cameras, and LIDAR. Such sensors can also be used to provide autonomous driving. These sensors provide data that is used by a data processing system to determine conditions surrounding the vehicle and to make decisions about how to control the vehicle by steering the vehicle or slowing down the vehicle or stopping the vehicle based upon the determined conditions. One disadvantage of these sensors is that they consume power such as battery power from a battery that powers the vehicle, and this power consumption can affect the driving range of the vehicle if the vehicle is an electric vehicle powered by one or more batteries. These sensors also require one or more data processing systems to process the data from the sensors in order to make decisions about the environment surrounding the vehicle. For example, data from a LIDAR sensor is processed to attempt to recognize, classify, or track objects in the environment, such as classifying recognized objects as vehicles that are in front or behind the vehicle and also classifying recognized objects within an image of LIDAR data as an image of pedestrians. Multiple LIDAR sensors can increase the field of view and increase the accuracy of object recognition and increase the accuracy of measurement of direction of motion and distance of a moving object. When multiple LIDAR sensors are used, such as a forward facing and rearward facing LIDAR sensor, there is even more power that is consumed and there is also an added increase in the computational load as more LIDAR data needs to be processed.

SUMMARY OF THE DESCRIPTION

In one embodiment, a vehicle that includes at least two LIDAR systems can process data from the two LIDAR systems in an interleaved manner such that data from only one of the two LIDAR systems captured during a given time period is processed, thereby reducing the computational load on a data processing system in the vehicle and also potentially reducing power consumption on the vehicle. For example, the data processing system can receive and process first LIDAR data captured by a first LIDAR system during a first time period and then receive and process second LIDAR data captured by a second LIDAR system during a second time period that follows the first time period. The data processing system does not process data from the second LIDAR system if available and captured by the second LIDAR system during the first period of time in one embodiment. In one embodiment, the first LIDAR system and the second LIDAR system have an overlapping field-of-view which can allow each of these LIDAR systems to operate as a backup LIDAR system should the other LIDAR system fail.

In one embodiment described herein, a vehicle can include: a first LIDAR system to generate a first set of LIDAR data for a first field of view captured during a first set of time periods; a second LIDAR system to generate a second set of LIDAR data for a second field-of-view captured during a second set of time periods, wherein the first set of time periods are different than the second set of time periods; and a data processing system coupled to the first LIDAR system and coupled to the second LIDAR system, the data processing system to process the first set of LIDAR data and to process the second set of LIDAR data, wherein for each time in the first set of time periods and the second set of time periods only one of the first set of LIDAR data or the second set of LIDAR data is processed by the data processing system. In one embodiment, the processing of the first set and the second set of LIDAR data includes one or more of object recognition, object classification, object tracking, or determination of an object's distance from the LIDAR system (which may be referred to as "range determination"). In one embodiment, when the first LIDAR system malfunctions the second LIDAR system can act as a backup for the first LIDAR system, and the first field-of-view overlaps substantially with the second field-of-view. In one embodiment, the time periods in the first set of time periods are interleaved with the time periods in the second set of time periods with no gaps in time between any of the time periods. In one embodiment, consecutive time periods in the first set of time periods are separated by a time in the second set of time periods and the data processing system does not process LIDAR data during a third set of time periods that interleave consecutive time periods in the first set of time periods. In one embodiment, the time periods in the third set of time periods have either fixed periods of time or are dynamically adjusted based on data about the vehicle and about an environment surrounding the vehicle. In one embodiment, the time periods in the third set of time are decreased as the vehicle's speed increases and these time periods are increased as the vehicle's speed decreases. In one embodiment, at least one of the first LIDAR system or the second LIDAR system dynamically adjust power consumption levels when the time periods in the third set of time periods are dynamically adjusted. In one embodiment, at least one of the first LIDAR system or the second LIDAR system reduce power consumption as the vehicle's speed decreases. In one embodiment, the first set of time periods and the second set of time periods cover different periods of time and wherein during any period in which LIDAR data is available only one of the first set of LIDAR data or the second set of LIDAR data is ever fully processed. In one embodiment, the second LIDAR system generates LIDAR data during the first set of time periods when the second LIDAR system acts as a backup system.

In one embodiment, a vehicle can include: a first LIDAR system to generate a first set of LIDAR data for a first field-of-view captured during a first set of time periods; a second LIDAR system to generate a second set of LIDAR data for a second field-of-view captured during a second set of time periods, wherein the first set of time periods are different than and interleaved in time with the second set of time periods; a data processing system coupled to the first LIDAR system and coupled to the second LIDAR system, the data processing system to process the first set of LIDAR data and to process the second set of LIDAR data, wherein during any time period in which LIDAR data is available from the first set of LIDAR data and the second set of LIDAR data, they are processed differently. In one embodiment, during any given time period, only LIDAR data from one of the first set of LIDAR data in the second set of LIDAR data is processed and the other is not. During a time period in which LIDAR data is available from both the first LIDAR system and the second LIDAR system, the data from the first LIDAR system is only partially processed (e.g., the data from the first LIDAR system is tested to determine if the first LIDAR system is functional) while the data from the second LIDAR system is processed to provide one or more of object recognition, object classification, object tracking or range determination and wherein partial processing of data from the first LIDAR system is configured to determine whether the first LIDAR system is malfunctioning. In one embodiment, when the first LIDAR system is determined to be malfunctioning, the second LIDAR system acts as a backup for the first LIDAR system by providing LIDAR data during the first set of time periods.

One embodiment for a vehicle can include a non-transitory machine readable medium storing executable program instructions which when executed by one or more data processing systems cause the one or more data processing systems in a vehicle to perform a method comprising: receiving, from a first LIDAR system, a first set of LIDAR data for a first field-of-view captured during a first set of time periods; receiving, from a second LIDAR system, a second set of LIDAR data for a second field-of-view captured during a second set of time periods, wherein the first set of time periods are different than and interleave in time with the second set of time periods; and processing the first set of LIDAR data and processing the second set of LIDAR data, wherein for each time period in the first set of time periods and in the second set of time periods only one of the first set of LIDAR data or the second set of LIDAR data is processed. In one embodiment, the processing of the first set and the second set of LIDAR data includes one or more of object recognition, object classification, object tracking or range determination. In one embodiment, when the first LIDAR system malfunctions the second LIDAR system acts as a backup for the first LIDAR system when the field-of-view of the first LIDAR system overlaps partially or substantially with the second field-of-view for the second LIDAR system. In one embodiment, the time periods in the first set of time periods are interleaved with time periods in the second set of time periods with no gaps in time between any of the time periods. In another embodiment, consecutive time periods in the first set of time periods are separated by one or more time periods in the second set of time periods and wherein the data processing system does not capture and process LIDAR data during a third set of time periods that interleave consecutive time periods in the first set of time periods. In one embodiment, time periods in the third set of time periods have either fixed periods of time or are dynamically adjusted based on data about the vehicle and data about an environment surrounding the vehicle. In one embodiment, the time periods in the third set of time periods are decreased as the vehicle's speed increases and are increased as the vehicle's speed decreases. In one embodiment, at least one of the first LIDAR system or the second LIDAR system dynamically adjust power consumption levels when the time periods in the third set of time periods are dynamically adjusted.

The embodiments described herein can include methods and vehicles which use the methods described herein. Moreover, the embodiments described herein can include non-transitory machine readable media that store executable computer program instructions that can cause one or more data processing systems to perform the one or more methods described herein when the computer program instructions are executed by the one or more data processing systems. The instructions can be stored in nonvolatile memory such as flash memory or dynamic random access memory or other forms of memory.

The above summary does not include an exhaustive list of all embodiments in this disclosure. All systems and methods can be practiced from all suitable combinations of the various aspects and embodiments summarized above and also those disclosed in the Detailed Description below.

BRIEF DESCRIPTION OF THE DRAWINGS

The present embodiments are illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
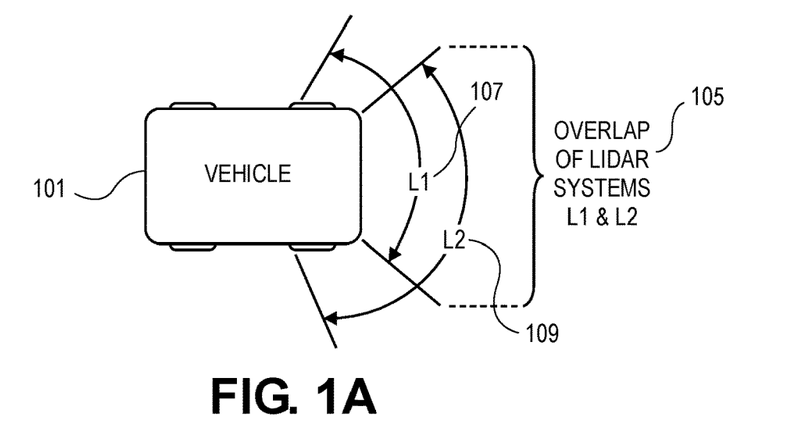
FIG. 1A shows a top view of a vehicle with two overlapping LIDAR systems where the overlap in the field of view of the two systems is large to allow backup between the two systems should one of them fail.
Figure 1B:
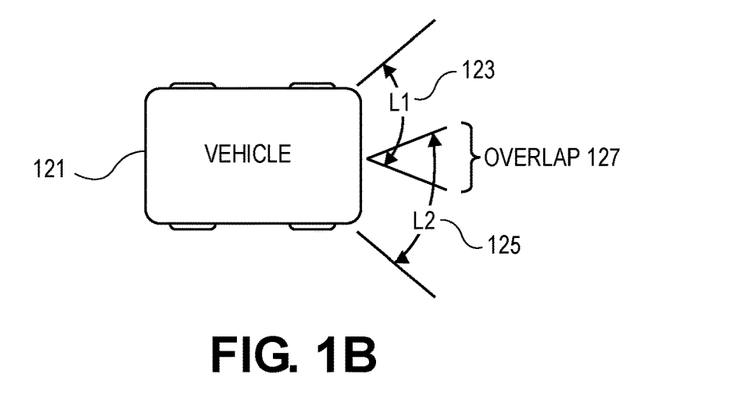
FIG. 1B is a top view of a vehicle with two overlapping LIDAR systems where the overlap is smaller than the system shown in FIG. 1A.

The embodiments described herein may use data from a plurality of LIDAR systems that may have an overlapping field-of-view and which can be operated in an interleaved manner over time to reduce one or both of power consumption of the LIDAR systems and the computational load of processing LIDAR data from the LIDAR systems. In one embodiment, at least two LIDAR systems, which can include conventional LIDAR sensors, can be configured to operate in an interleaved manner over time such that during any one given period of time only one set of LIDAR data is processed from one of the sensors rather than processing data captured during that period of time from both sensors. The overlap of the field of view can be substantial (even as high as 100% overlap) or minimal depending on the embodiment. FIGS. 1A and 1B show two different examples in which there is overlap between two LIDAR sensors on a vehicle. In one embodiment, vehicle 101 can include a first LIDAR system 107 and a second LIDAR system 109 which are positioned to capture LIDAR data in one direction on the vehicle which may be a front or forward-looking direction of the vehicle. In the example shown in FIG. 1A, the overlap 105 is substantial and covers most of the forward-looking direction of the vehicle 101 as shown in FIG. 1A. In another embodiment, the overlap may be a complete (100%) overlap such that the two LIDAR systems have the same field of view. In some embodiments, one or both of the LIDAR systems may be moveable or capable of changing their field of view. For example, slight movement of one or both LIDAR systems may be used to improve their field of view. This movement may be used when one LIDAR system fails and the other acts as a backup system. The backup LIDAR system can be moved to capture a field of view that includes more of the field of view of the failed LIDAR system (e.g., referring to FIG. 1B, if L1 fails, L2 can be moved counter clockwise to capture more of the front view of the vehicle and hence include more of the field of view of L1). The LIDAR systems can use software that is calibrated based on the predetermined fixed position (if the LIDAR system is not moveable) or is calibrated for a set of possible predetermined positions if the LIDAR systems are moveable to those possible predetermined positions. LIDAR system 107 and LIDAR system 109 can be configured to operate as described herein relative to the graphs shown in FIG. 2A or 2B and can be configured to operate in the method shown in FIGS. 3, 4A, and 5A. In the example shown in FIG. 1A, the LIDAR systems 107 and 109 include a field-of-view which is less than 360°; in an alternative embodiment, the LIDAR systems 107 and 109 may have a larger field of views such as a 360° field-of-view for each of the LIDAR systems 107 and 109.

FIG. 1B shows another example of two LIDAR systems on a vehicle 121; in this example, the LIDAR systems may be forward or rearward facing LIDAR systems which capture LIDAR data in view of the sensors at any one point in time. In the example shown in FIG. 1B, the first LIDAR sensor 123 has an overlap 127 with the second LIDAR sensor 125, and this overlap 127 is smaller than the overlap 105 is shown in FIG. 1A. While the overlap is smaller, the embodiments described herein can be used with the LIDAR sensors 123 and 125 as described further below. It will be appreciated that additional LIDAR sensors may be used on a vehicle such as rearward looking LIDAR sensor or sensors, side looking LIDAR sensors and potentially other LIDAR sensors. In an alternative embodiment, the LIDARs may have no overlap of their field of views, such as a forward looking LIDAR system and a rearward looking LIDAR system; this alternative embodiment can use the methods shown in any one or more of FIGS. 2A, 2B, 3, 5A and 5B to reduce computational load on the data processing system(s) in the vehicle.

Figure 2A:
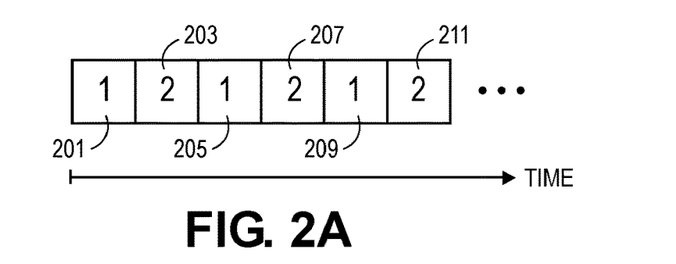
FIG. 2A shows a graph over time of two sets of captured LIDAR data that are interleaved over time, where each set can be obtained from one of two different LIDAR systems that can have overlapping field of views.

FIG. 2A shows an example over time of how captured data, which is LIDAR data captured from two LIDAR sensors over time, can be processed in a manner which can reduce power consumption and computational load on data processing systems in the vehicle. In the example shown in FIG. 2A, there is no gap in time for captured LIDAR data such that at any one point in time, there is some captured LIDAR data in the field-of-view of the two LIDAR sensors, which are capturing LIDAR data in the example shown in FIG. 2A. In one embodiment, the LIDAR sensors 107 and 109 in FIG. 1A can be used to capture LIDAR data in consecutive time windows or time periods such as time periods 201, 203, 205, 207, 209, and 211 which are sequential in time as shown in FIG. 2A. In particular, LIDAR sensor 107 can capture LIDAR data in time periods 201, 205, 209 while LIDAR system 109 can capture LIDAR data during time periods 203, 207, and 211. In one embodiment, LIDAR system 107 does not capture LIDAR data during time periods 203, 207 and 211 (when LIDAR system 109 is capturing LIDAR data), and LIDAR system 109 does not capture LIDAR data during time periods 201, 205 and 209 (when LIDAR system 107 is capturing LIDAR data). These two different sets of time periods are interleaved in time as shown in FIG. 2A and thus during any one given period of time, LIDAR data captured during that period of time from only one of the sensors is processed and thus LIDAR data if available from the other sensor is not processed even if it is captured during that period of time. This can reduce power consumption and also reduce computational load on the data processing systems in a vehicle. Each of the time periods 201, 203, 205, 207, 209, and 211 represent time periods in which LIDAR data is captured by one of the two different LIDAR systems, such as LIDAR systems 107 and 109 shown in FIG. 1A or LIDAR systems 123 and 125 shown in FIG. 1B.

Figure 2B:
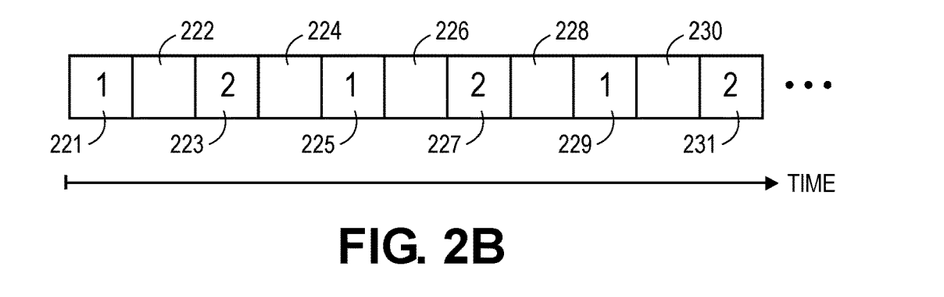
FIG. 2B shows a graph over time of two sets of captured LIDAR data that are interleaved over time, where each set can be obtained from one of two different LIDAR systems that can have overlapping field of views but, unlike the example in FIG. 2A, the example in FIG. 2B uses a series of gaps in time where no LIDAR data is captured and processed in those gaps.

FIG. 2B shows another method for capturing interleaved sets of LIDAR data from two different LIDAR systems. In the example shown in figure B, there are gaps in time in which no LIDAR data is captured such as during time periods 222, 224, 226, 228, and 230 as shown in FIG. 2B. In the example shown in FIG. 2B, a first LIDAR system, such as LIDAR system 107 can capture LIDAR data during time periods 221, 225, and 229, and a second LIDAR system, such as LIDAR system 109 can capture LIDAR data during time periods 223, 227, and 231. During the periods of time 222, 224, 226, 228, and 230, no LIDAR data is captured and thus the LIDAR systems can significantly reduce power consumption and computational load by not processing LIDAR data during those periods of time in which LIDAR data is not captured. In the example shown in FIG. 2B, LIDAR data is captured by the two different LIDAR systems in an interleaved manner over time and these LIDAR systems can have a substantial overlap in a field-of-view, such as the overlap 105 shown in FIG. 1A. This can enable each of the two different LIDAR systems to act as a backup for the other LIDAR system should one of the LIDAR systems malfunction.

Figure 3:
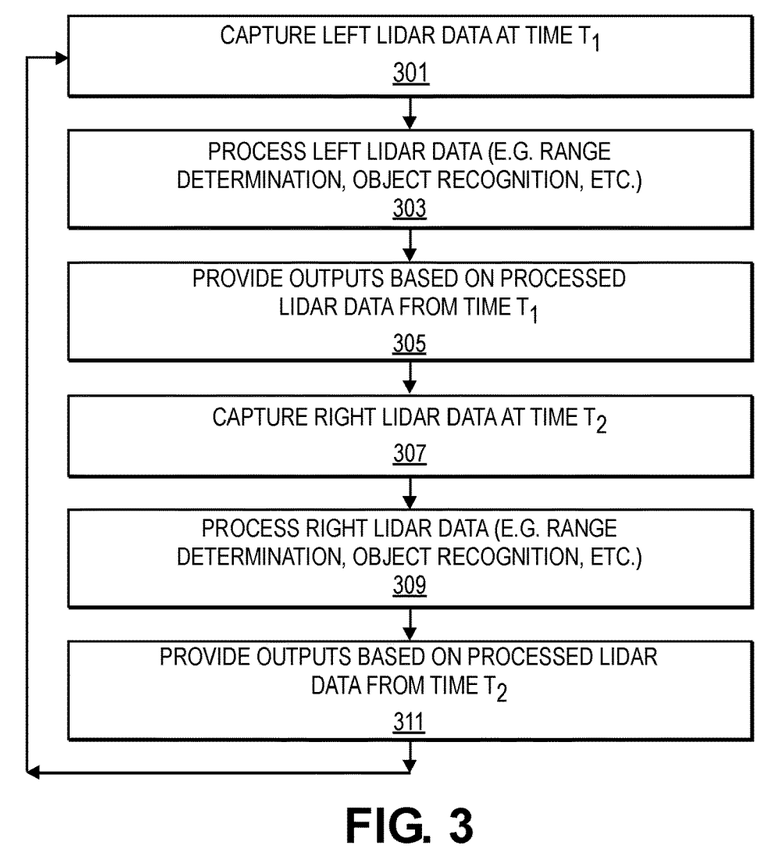
FIG. 3 is a flow chart which shows a method according to one embodiment which uses two LIDAR systems.

FIG. 3 shows a method according to one embodiment for using a plurality of LIDAR systems to capture LIDAR data in an interleaved manner over time to thereby reduce power consumption and computational load. In operation 301, a first LIDAR system can capture LIDAR data; this can be for example the LIDAR system 107 which is on the left side of the vehicle as shown in FIG. 1A. In operation 303, a data processing system can process the captured LIDAR data which was captured in operation 301. This processing of the LIDAR data captured in operation 301 can include distance determination, object recognition, classification or tracking and other processing tasks which are known in the art for processing LIDAR data. Then in operation 305 the outputs from the LIDAR system can be provided to a data processing system (e.g., the same data processing system used in operation 303 or a different system) where these outputs are based on the processed LIDAR data captured at time T1 in operation 301 and the data processing system can make decisions about how to control the vehicle as is known in the art. In operation 307, the second LIDAR system can capture LIDAR data; for example the LIDAR system 109 can capture LIDAR data on the right side of the vehicle at time T2 in operation 307. Then that LIDAR data captured in operation 307 can be processed in operation 309 to determine ranges or recognize objects or classify objects or other processing results known in the art for processing LIDAR data. In operation 311, the outputs from the processing operation in operation 309 can then be provided to a data processing system (which can be the same data processing system used in operations 303 or 305 or a different system) in order to make decisions about how to control the vehicle as is known in the art. After operation 311, processing can revert back to operation 301 to continue again in the manner shown in FIG. 3. In one embodiment, right LIDAR data which may be captured by a LIDAR sensor during time T1 is not processed even if it is available. Similarly, left LIDAR data which may be captured during time T2 is also not processed even if it is available. In one embodiment, the LIDAR system for which data will not be processed during a particular time period may not even attempt to capture LIDAR data. For example, during time T1 the right LIDAR system may not capture any LIDAR data and during time T2, the left LIDAR system may not capture any LIDAR data. In one embodiment, the processing systems may instead of being idle during a particular period of time may verify the functionality of the LIDAR system but not otherwise attempt to capture and process a full set of LIDAR data. For example, during operation 301 the right LIDAR sensor may attempt to confirm its functionality without attempting to fully capture and process LIDAR data during time T1 while the left LIDAR system captures and processes LIDAR data during time period T1. In this example, during any given period of time in which LIDAR data is available, one set of LIDAR data is processed differently than another set of LIDAR data; for example when one LIDAR system (e.g., L1) fully processes LIDAR data captured during a particular time period, the other LIDAR system (e.g., L2) can verify its functionality (without attempting to process a full frame of LIDAR data) during that same particular time period. In the next time period the roles can be reversed so that L1 verifies its functionality while L2 captures and fully processes a full frame of LIDAR data. Verification of the functionality of a LIDAR system can involve selectively testing only a limited set of locations in a frame of LIDAR data without processing all or most of the outputs from the full frame of LIDAR data. For example, rather than processing all x, y locations in a plane of LIDAR data, the verification can examine outputs from the LIDAR receiver (that captures reflected LIDAR signals originated from the LIDAR system) for a portion of those x, y locations (such as the upper left and lower right locations). In this way, the verification can generally confirm functionality without consuming more computational resources.

Figure 4A:
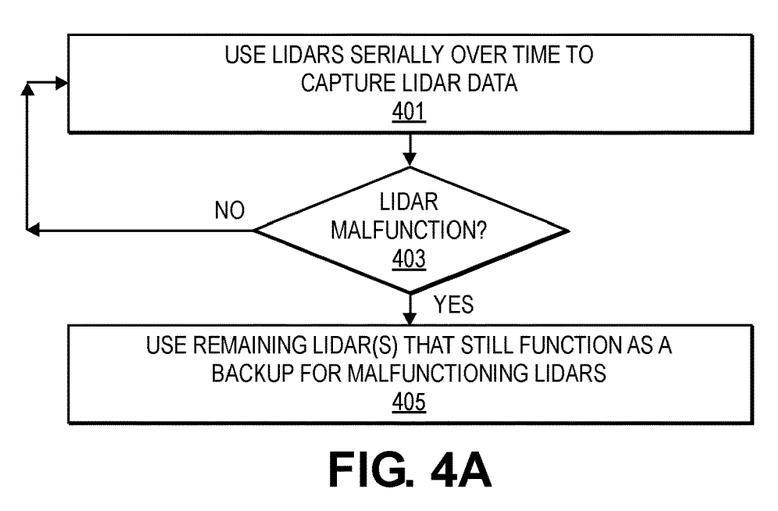
FIG. 4A is a flow chart that shows a method according to one embodiment that provides for a backup system when at least two LIDAR systems are used.
Figure 4B:
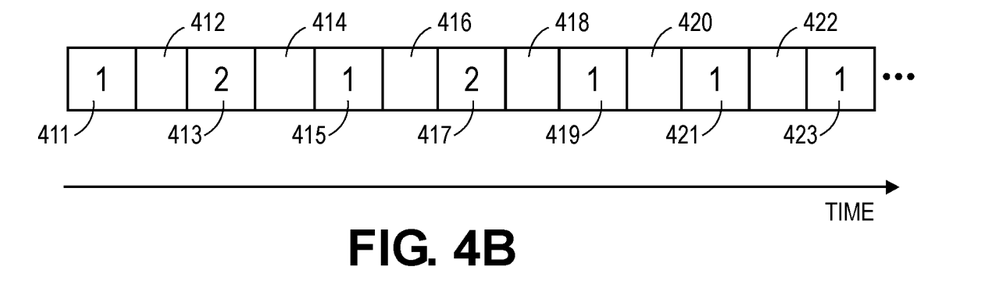
FIG. 4B shows, along a time line, a set of captured LIDAR data that begins with data from two LIDAR systems and then changes to data from only one LIDAR system after one of the LIDAR systems malfunctions.

The overlap of LIDAR systems can allow a fusion of data from the overlapping portion of the images from the two LIDAR systems. Thus, for example, LIDAR systems 107 and 109 can use data in the overlapping portions of those images to confirm object classifications (e.g. a data processing system verifies that an object that appears in the overlap region is classified in the same way in both images). This overlap can also be used to provide redundancy of the systems in the case of a failure of one of the LIDAR systems which overlap. This confirmation of objects in the overlap can be used to increase a confidence rating of a system that classifies objects if the classification from the different LIDAR systems is the same, and if they differ than the classification can be assigned a lower confidence rating. FIG. 4A shows a method according to one embodiment in which the overlap between a plurality of LIDAR systems can be used to allow one LIDAR system to act as a backup for another LIDAR system which is malfunctioning. The method shown in FIG. 4A can be used in a system of multiple LIDAR systems where they have been used serially over time, and FIG. 4B shows an example of such a LIDAR system. In operation 401 of FIG. 4A, the LIDAR sensors are used serially over time to capture LIDAR data. Operation 401 can resemble the method shown in FIG. 3 in which two different LIDAR systems are used sequentially rather than in parallel to process captured LIDAR data. If operation 403 detects that one of the LIDAR systems is malfunctioning then the remaining LIDAR system or systems that still function can act as a backup for the malfunctioning LIDAR system in operation 405. In the example shown in FIG. 1A, LIDAR system 107 can act as a backup LIDAR system should LIDAR system 109 malfunction. While this may reduce the overall field-of-view based on the remaining LIDAR system 107 which still functions, the overlapping LIDAR systems can be designed to take into account a failure of one of the LIDAR systems so that the remaining LIDAR system has a sufficient field-of-view for the vehicle to still operate and provide assisted driving or autonomous driving functionality for the safe operation of the vehicle. FIG. 4B shows an example of how the two LIDAR systems can initially work in a serial manner over time, such as the method shown in FIG. 3, and then switch into a mode in which the one LIDAR system acts as a backup for the malfunctioning LIDAR system. In the example shown in FIG. 4B, gaps exist between LIDAR images which are captured, and these are shown as gaps 412, 414, 416, 418, 420, and 422. During time period 411 and 415, the first LIDAR system captures and processes LIDAR data which is captured during those respective time periods. In time periods 413 and 417, the second LIDAR system captures LIDAR data and processes the LIDAR data. Sometime after the capture of LIDAR data during time period 417, the system determines that the second LIDAR system is malfunctioning and switches to the use of the first LIDAR system to act as a backup for the malfunctioning second LIDAR system. This is shown in time periods 419, 421, and 423 in which the first LIDAR system captures LIDAR data during those time periods and the second LIDAR system does not participate in the capture or processing of LIDAR data. Had the second LIDAR system not malfunctioned, it would have captured LIDAR data during the time period 421 but because it has malfunctioned, the first LIDAR system captures LIDAR data during the time period 421 rather than the second LIDAR system. In one embodiment, the vehicle can continuously monitor the functional status of each LIDAR system and should the second LIDAR system become functional again, it can resume being used in the alternating pattern shown in FIG. 4B.

Figure 5A:
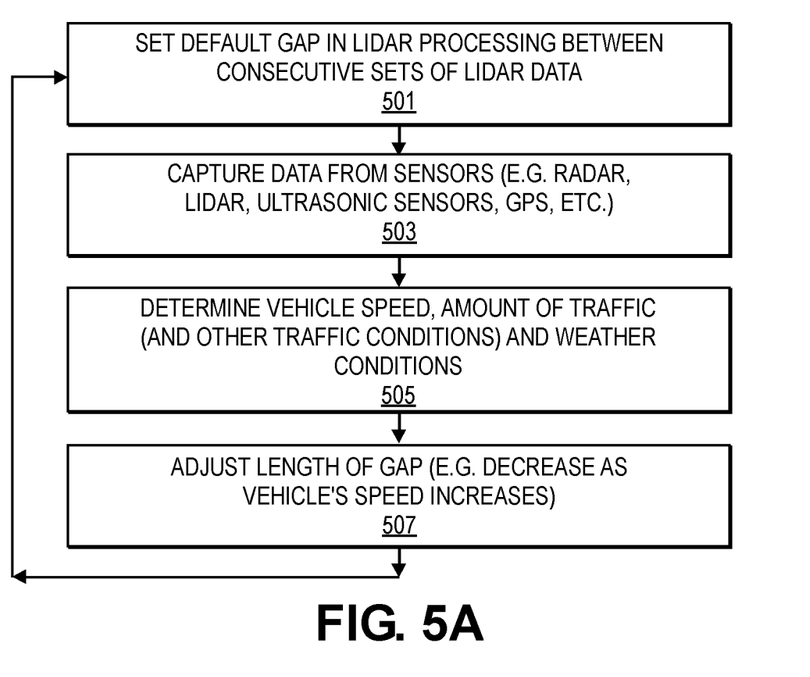
FIG. 5A shows a flow chart according to one embodiment in which a gap in time between processed LIDAR data is varied based upon information that is derived from data about the vehicle (e.g., speed of the vehicle) and data about the environment surrounding the vehicle (e.g., number of vehicles around the vehicle, etc.)
Figure 5B:
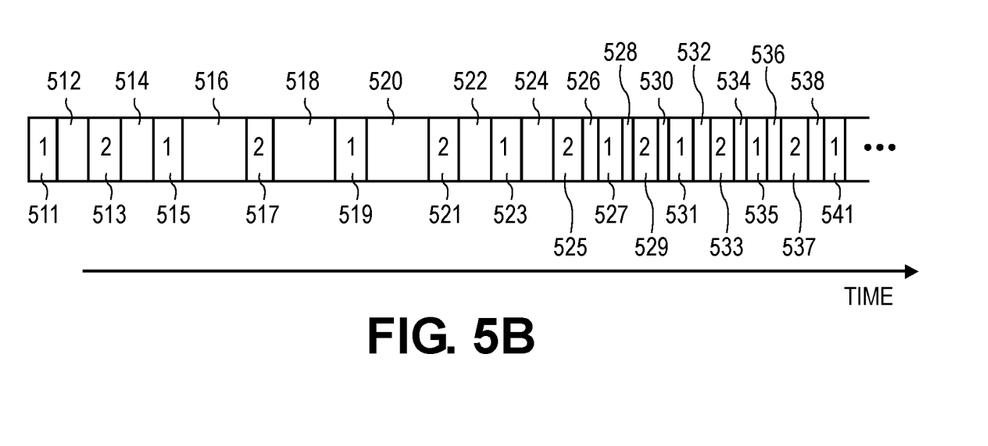
FIG. 5B shows, along a time line, a set of captured LIDAR data from two LIDAR systems in which a gap between processed LIDAR data is varied.

The use of gaps or overlaps in time between adjacent captured LIDAR data can also potentially reduce power consumption by multiple LIDAR systems, and FIGS. 2B and 4B show two examples of the use of such gaps or overlaps in time in the process of gathering or capturing LIDAR data. In one embodiment, these gaps or overlaps in time may be dynamically adjusted in length depending upon the circumstances or conditions of the vehicle. In one embodiment, the gaps can be dynamically reduced to the point where there are no gaps between consecutively processed LIDAR data sets; further, the system can switch to a mode in which there are no gaps and in addition there is an overlap in time such that more than one LIDAR system is capturing LIDAR data during the same time period to provide multiple sets of LIDAR (for similar fields of view) from the different LIDAR systems, and these multiple sets of LIDAR data are all processed to provide information from the overlapping (in time and space) LIDAR data from the more than one LIDAR systems. FIG. 5A and FIG. 5B show an example of how the length of these gaps or overlaps in time can change (hence providing varying time durations) depending upon the circumstances of the vehicle and the conditions surrounding the vehicle. In operation 501 shown in FIG. 5A, a system can set a default gap in time in the processing of LIDAR data between consecutive sets of captured LIDAR data. This default gap can be based upon standard vehicle reaction times which relate to the time required to react to an incident or to take action with respect to an incident. For example, the default gap may be as short as 10 ms in one embodiment and may be as long as 100 milliseconds in another embodiment. Once the default gap has been set, the system can then vary or adjust the length of the gap in time based upon vehicle parameters and conditions surrounding the vehicle. This is shown in FIG. 5A in operations 503, 505, and 507. In operation 503, various sensors on the vehicle can capture data about the vehicle and about the surrounding conditions of the vehicle. For example, one or more radar sensors, one or more LIDAR sensors, one or more radios, one or more ultrasonic sensors, GPS sensors for determining the location of the vehicle, etc. can capture data about the status of the vehicle and the conditions surrounding the vehicle. Then in operation 505, the system can determine various parameters such as the speed of the vehicle, the amount of traffic on the road, and other traffic conditions and weather conditions. These conditions and other information can be used to decide whether to adjust the length of the gap. In operation 507, the system can adjust the length of the gap based upon vehicle information and information about the conditions and circumstances surrounding the vehicle.

For example, the gap may be decreased in length as the vehicle's speed increases. Conversely, as the vehicle's speed decreases, the length of gap may be increased. A longer gap may be tolerable as the vehicle's speed decreases while a shorter gap in time between adjacent LIDAR captures may be advisable given the higher speed of the vehicle. Similarly, when there is more traffic on the road, the gap may be decreased in length in order to provide more information at a faster rate for the system to account for the increase in traffic which can lead to an increase in hazards on the road. Similarly, poor weather conditions may require a smaller gap than good weather conditions. In one embodiment, the adjustment of the gap can be learned from a machine learning algorithm that is trained to adjust the gap so that error conditions are maintained at a consistently low level across a variety of different gaps and a variety of different conditions. A machine learning algorithm can be trained using simulations of different environments and different conditions, and these simulations can be based on video recordings of these environments and conditions so that the LIDAR systems can produce outputs (based on these recordings) that are processed and then analyzed to determine how to adjust the gaps to maintain or improve object recognition or object classification. The training can be performed iteratively for a vehicle's speed to determine a candidate gap time for the speed, and this can be repeated for different vehicle speeds.

In another embodiment, the adjustment of the gap (or overlap) can be based on one or more equations that take into account, for example, the speed of the vehicle, the traffic density surrounding the vehicle, and the overlap (e.g., overlap of field of view or POV) of the multiple LIDAR systems. In one such embodiment, a time duration can be adjusted based upon the following example of a generalized equation:

$$T_L = f(a_1 N^{x1} + a_2 S^{x2} + a_3 O_H^{x3} + a_4 O_V^{x4} + a_5 T_F^{x5} + a_6 T_R^{x6}$$

$T_L$=Length of a Time Duration
N=Total number of LIDARs
S=Speed of vehicle
$O_H$=Horizontal Overlap in usable POV (a number varying from 0-1; 0 means no overlap and 1 means 100% overlap) between LIDAR systems
$O_V$=Vertical Overlap in usable POV (a number varying from 0-1; 0 means no overlap and 1 means 100% overlap) between LIDAR systems
$T_F$=Traffic Density such as density in Front (a number varying from 0-9)
$T_R$=Traffic Density such as density in Rear (a number varying from 0-9)
a1, a2, a3, a4, a5, a6 are numbers ranging from −9 to +9
x1, x2, x3, x4, x5, x6 are numbers ranging from 0 to 9

The equation can be configured to change the duration of a gap in the manner described by selecting appropriate values for a1, a2, . . . a6, and x1, x2 . . . x6 such that, in one embodiment, as traffic density increases the gap gets smaller and as traffic density decreases the gap gets longer and as speed increases the gap gets smaller and as speed decreases the gap gets longer. The traffic density values can, in one embodiment, be the density of traffic in view of a respective LIDAR. In another embodiment, a form of the formula can be used to calculate a time duration of a useful captured LIDAR data set and can be used in the embodiments relating to FIGS. 5C, 5D, 5E and 5F.

The method shown in FIG. 5A can repeat over time and thus after adjusting the length of the gap in operation 507, the processing can revert back to operation 501 to repeat the operations as shown in FIG. 5A. FIG. 5B shows an example over time of how the gaps between adjacent LIDAR image capturing operations can be adjusted based upon conditions surrounding the vehicle as well as the vehicle's status such as vehicle speed. FIG. 5B shows that a first LIDAR system captures LIDAR information during time periods 511, 515, 519, 523, 527, 531, 535, and 541. FIG. 5B also shows that the second LIDAR system captures LIDAR information during the time periods 513, 517, 521, 525, 529, 533, and 537. As shown in FIG. 5B, between each of the consecutive capturing's of LIDAR data, there is a time period which is a gap in which no LIDAR data is captured (or the LIDAR data captured is not used—it is ignored), and as shown in FIG. 5B, the gap is varied in length such that one gap is longer in time than another gap. For example, gaps 518 and 520 are longer in time than gaps 512 and 514. Gaps 516, 518, and 520 may result from the vehicle slowing down to a very slow speed causing the system to adjust the length of time between consecutive LIDAR image capturing's. As the vehicle speed increases, the gap can be decreased as shown in gaps 526, 530, 532, 534, 536, and 538. In one embodiment, when the gaps become sufficiently long, it may be possible to increase power conservation by placing certain components of a LIDAR system in a sleep mode or low-power mode and then reactivating them at the end of a gap.

Figure 5C:
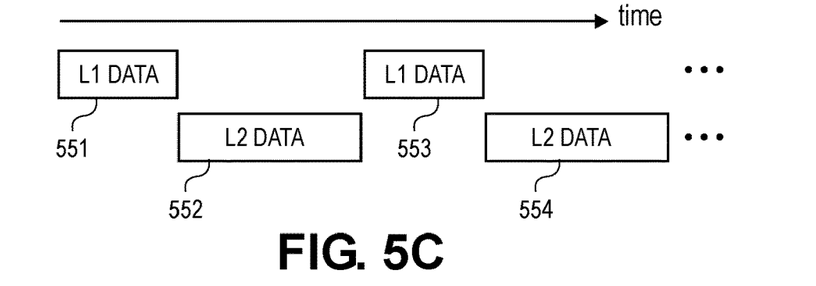
FIG. 5C shows an example, according to one embodiment, in which, over a time period, more LIDAR data from one LIDAR system is processed than LIDAR data from another LIDAR system.

FIGS. 5C, 5D, 5E, and 5F show examples of embodiments in which different durations of captured LIDAR data from different LIDAR systems are processed; this is different than the example shown in FIG. 2A in which equal amounts, in time, of captured LIDAR are processed from two LIDAR systems. In the example shown in FIG. 5C, one or more data processing systems process more captured LIDAR data from the LIDAR system L2 than from the LIDAR system L1 over a period of time that can repeat. For example, the L1 data 551 and L1 data 553 may each be 200 ms (milliseconds) of captured LIDAR data (from the L1 system) while the L2 data 552 and L2 data 554 may each be 400 ms of capture LIDA data (from the L2 system); in this example processing of LIDAR data from the L2 system is prioritized over processing of LIDAR data from the L1 system such that over a time period of 1.2 seconds, 800 ms of LIDAR data from the L2 system is processed after it is captured while 400 ms of LIDAR data from the L1 system is processed after it is captured. It will be appreciated that these time durations of 400 ms for processing L2 data and 200 ms for processing L1 data are examples given for the purpose of illustration and that other time durations can be used for processing the two streams of captured LIDAR data. In the example of FIG. 5C, there are no time durations in which no LIDAR data is processed (and thus FIG. 5C resembles in this sense FIG. 2A), but in an alternative embodiment of what is shown in FIG. 5C there can be gaps in time in which no LIDAR data is processed even if there is LIDAR data that was captured during those gaps. In the example of FIG. 5C, LIDAR data from the L1 system is not processed during the gap in time between L1 data 551 and L1 data 553; similarly, LIDAR data from the L2 system is not processed during the gap in time between L2 data 552 and L2 data 554. The L1 LIDAR system (which captures L1 data) in FIG. 5C may be the LIDAR sensor 123 in FIG. 1B, and the L2 LIDAR system (which captures L2 data) in FIG. 5C may be the LIDAR sensor 125 in FIG. 1B. The prioritization of processing one set of LIDAR data over another set can be based upon a risk assessment for each LIDAR system that can take into account one or more factors such as the vehicle's speed, traffic density in the field of view of each LIDAR system, map information about the current location (e.g. local road structures at the current location such as number of lanes, presence of center divider or barrier, presence and size of road shoulders at the current location, etc.), and other sensor data such as camera(s) and radar data. This risk assessment can, at least in part, use one or more formulas, such as the formula specified above where the formula can be used for each LIDAR system (e.g., L1 and L2) based upon the traffic density in the field of view of the particular LIDAR system (and the current traffic density in the field of view of the other LIDAR system is either ignored or given little weight in the formula for the particular LIDAR system).

For example, an equation for the L1 system can use vehicle speed and traffic density in the field of view of the L1 system (while ignoring traffic density in the field of view of the L2 system) to determine a suggested time duration for a useful set of L1 data, and a separate (and different) equation for the L2 system can use vehicle speed and traffic density in the field of view of the L2 system (while that separate equation for the L2 system ignores the traffic density in the field of view of the L1 system) to determine a suggested time duration for a useful set of L2 data. The outputs of the two equations can be used to determine a ratio (such as 0.67) that is used to allocate time durations within a fixed time period such as 1 second so that, based on the ratio, one LIDAR system gets allocated one time duration which is a portion of the fixed time period (e.g. 300 ms) and the other LIDAR gets allocated the remaining time of the fixed time period (e.g. 700 ms).

Figure 5D:
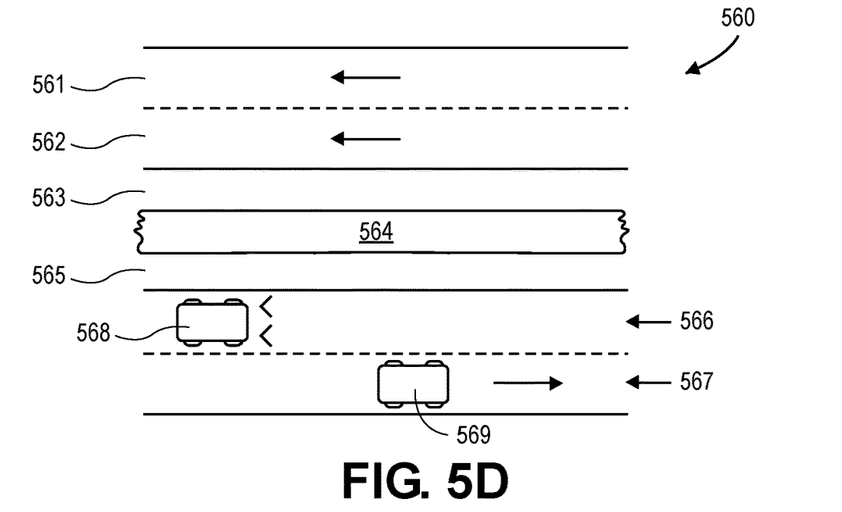
FIG. 5D shows an example of an environment around a vehicle which may cause a difference in the amount of LIDAR data processing between two (or more) LIDAR systems.

FIG. 5D provides an example of how a risk assessment (for local environment 560) for each front/forward looking LIDAR system can prioritize between LIDAR systems (such as L1 and L2 in FIG. 1B). In FIG. 5D, the vehicle 568 includes a left front LIDAR system (such as L1 in FIG. 1B) that captures forward looking data and a right front LIDAR system (such as L2 in FIG. 1B) that captures forward looking data that partially overlaps with data from L1. The vehicle 568 is traveling east in lane 566 on a four lane highway (two east bound lanes 566 and 567 and two west bound lanes 561 and 562); the highway includes a center barrier (e.g., concrete barrier 564) that separates the east bound lanes from west bound lanes. Further, there is a road shoulder 563 between lane 562 and the concrete barrier 564, and there is a road shoulder 565 between lane 566 and the concrete barrier 564. The presence of the concrete barrier 564 and the road shoulder 565 can be confirmed by map information based on the current location (via GPS) of vehicle 568 and also verified by sensor data such as camera(s) data and radar data from which the barrier is recognized. A vehicle 569 is also shown travelling east in lane 567 but there is no other vehicle in lane 566 in front of vehicle 568.

In this local environment 560, it may be safe for vehicle 568 to process more L2 data than L1 data over a given time period, and thus the processing system(s) in vehicle 568 can use the example of FIG. 5C to process more LIDAR data from the right front LIDAR system on vehicle 568 than LIDAR data from the left front LIDAR system on vehicle 568, where the left front LIDAR system is closer to the concrete barrier 564 than the right front LIDAR system. The concrete barrier 564 and the shoulder 565 and the absence of vehicles in lane 566 in front of vehicle 568 can provide a lower risk assessment than the right side of vehicle 568 and thus more data over time captured from the right front LIDAR system can be processed than captured data from the left front LIDAR system. This risk assessment can be performed repeatedly over time as conditions change and thus can cause changes in the prioritization of processing of LIDAR data sets from different LIDAR systems, and this is shown in two examples shown in FIGS. 5E and 5F.

Figure 5E:
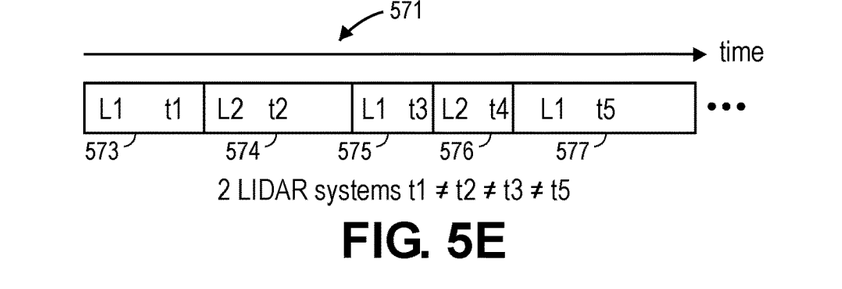
FIG. 5E shows another example of a variation of the amount of time of processed LIDAR data between multiple LIDAR systems.

In FIG. 5E, processing of captured LIDAR data from two LIDAR systems (L1 and L2) is prioritized over time 571 in five times durations shown as time durations 573, 574, 575, 576 and 577. Time durations 573 has a time duration of t1 which is different than the time durations t2, t3 and t5 of time durations 574, 575, and 577 respectively. In one embodiment, during each of the time durations shown in FIG. 5E, only one set of captured LIDAR data is processed (so the other set of captured LIDAR data is not processed); for example, during time duration 573 only captured LIDAR data from the L1 LIDAR system is processed (and LIDAR data captured by the L2 LIDAR system during that same time duration is ignored and not processed). Over time, a risk assessment (e.g., based on traffic density in the field of view of a LIDAR system) can change and thus the processing priority for that LIDAR system can change over time and this can be seen by comparing time durations 573, 575 and 577.

Figure 5F:
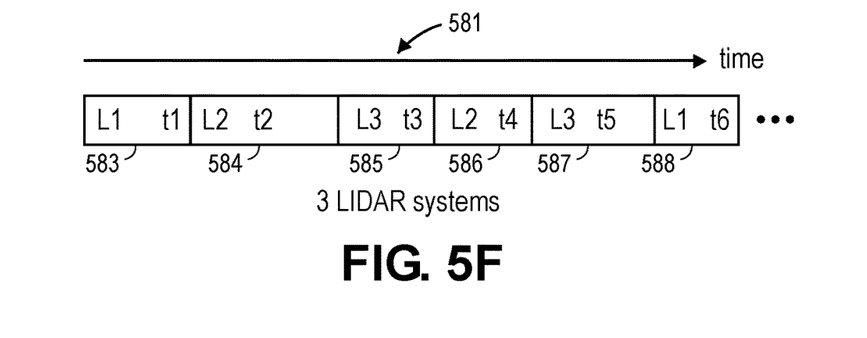
FIG. 5F shows another example of a variation of processed LIDAR data among multiple LIDAR systems.

FIG. 5F shows an example of a vehicle that includes three LIDAR systems such as a rear LIDAR system (L1), a left front LIDAR system (L2), and a right front LIDAR system (L3). Processing of captured LIDAR data from these three LIDAR systems can be prioritized over time 581 in the six time durations 583, 584, 585, 586, 587 and 588 as shown in FIG. 5F. In the example of FIG. 5F, the vehicle is moving forward so captured LIDAR data from the rear LIDAR system (L1) is given a low processing priority (relative to data from L2 and L3) and hence is processed less than LIDAR data from the forward looking LIDAR systems L2 and L3. FIG. 5F also shows that the processing priority between L2 and L3 changes over time 581.

According to another aspect of this disclosure, an embodiment can use methods and systems for processing LIDAR data from a single LIDAR system that generates LIDAR data for a first set of time periods that are not consecutive in time and are interleaved by time periods (in a second set of time periods) from which no LIDAR data from the single LIDAR system is processed. In this embodiment, the single LIDAR system intermittently captures or provides LIDAR data from the field of view of the single LIDAR system; in other words, the processed output of this single LIDAR system is not consecutive or continuous over time. The time periods in the second set of time periods interleave the time periods in the first set of time periods. In one embodiment these time periods in the second set of time periods can be fixed time periods that do not vary; in another embodiment, these time periods in the second set of time periods can vary dynamically based upon data about the vehicle (e.g. speed of vehicle) or data about the environment surrounding the vehicle (e.g. rainy weather). The time periods in this second set of time periods for a single LIDAR can be based upon the method shown in FIG. 5A. For example, the time periods in the second set of time periods can be decreased as the vehicle's speed increases and can be increased as the vehicle's speed decreases.

Figure 6:
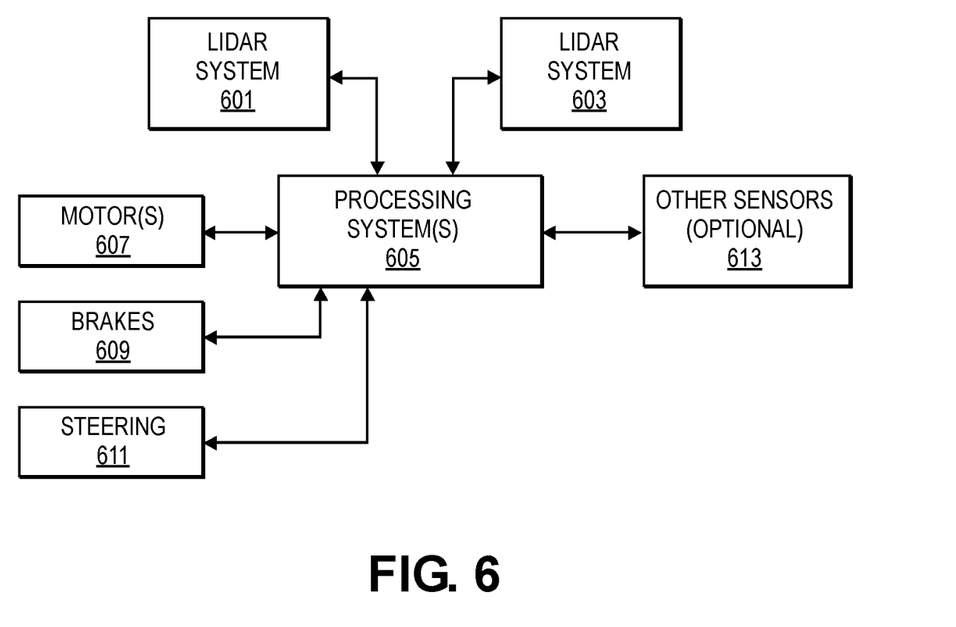
FIG. 6 shows an example of a data processing system that can be used to process data from sensors on a vehicle such as a set of LIDAR sensors.

The embodiments described herein can be implemented in a vehicle which includes one or more processing systems which can be implemented as a set of one or more general purpose computers or a set of one or more special purpose computers which may also include dedicated hardware such as one or more LIDAR systems. FIG. 6 shows an example of a set of sensors and vehicle components which can be included within a vehicle to implement one or more embodiments described herein. The processing system 605 can be one or more data processing systems which are coupled to one or more motors 607, one or more brakes 609, and a steering system 611. In addition, if the vehicle is an electric battery powered vehicle, the various components shown in FIG. 6 can also be coupled to one or more batteries to provide power to the motors 607 and the processing system 605 and the sensors, including the LIDAR system sensors 601 and 603. In one embodiment, the vehicle can include other sensors, such as sensors 613 which can include one or more radar sensors, one or more ultrasonic sensors, cameras to capture optical images, weather sensors, and microphones to capture audio information. Although the processing system 605 is shown as a single system, for other embodiments, it can include multiple processors or can comprise multiple separate computers that can communicate and coordinate with one another. In one embodiment, the processing system 605 includes one or more microprocessors or microcontrollers which are coupled to one or more memories such as dynamic random access memory as well as nonvolatile memory such as flash memory. The processing system 605 can also include one or more buses that interconnect the processing logic such as the microprocessors or microcontrollers with the memory and with the sensors such as the sensors 613 and the LIDAR system 601 and the LIDAR system 603. Moreover, the one or more buses which are part of the processing system 605 can also be coupled through input/output controllers to the one or more motors 607, the one or more brakes 609 and the steering system 611. The system shown in FIG. 6 can also include one or more radios to receive information from radio systems and can include one or more GPS receivers or other position location determining systems. The radio systems can include transceivers to receive information about weather or traffic or other information such as entertainment information which can be used by passengers in the vehicle.

It will be apparent from this description that embodiments and aspects of the present invention may be embodied, at least in part, in software. That is, the techniques may be carried out in a set of one or more data processing systems in response to its processor(s) executing a sequence of instructions contained in a storage medium, such as a non-transitory machine-readable storage medium (e.g. volatile DRAM or non-volatile flash memory). In various embodiments, hardwired circuitry (e.g. special purpose hardware) may be used in combination with software instructions to implement the present invention. Thus the techniques are not limited to any specific combination of hardware circuitry and software, or to any particular source for the instructions executed by the set of one or more data processing systems.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:
1. A vehicle comprising:
a first LIDAR system to generate a first set of LIDAR data for a first field of view captured during a first set of time periods;
a second LIDAR system to generate a second set of LIDAR data for a second field of view captured during a second set of time periods, wherein the first set of time periods are different than the second set of time periods;
a data processing system coupled to the first LIDAR system and coupled to the second LIDAR system, the data processing system to process the first set of LIDAR data and to process the second set of LIDAR data, wherein for each time period in the first set of time periods and the second set of time periods only one of the first set of LIDAR data or the second set of LIDAR data is processed by the data processing system, wherein the processing of the first set and the second set of LIDAR data includes one or more of object recognition, object classification, object tracking, or distance determination, wherein consecutive time periods in the first set of time periods are separated by a time period in the second set of time periods and wherein the data processing system does not process LIDAR data during a third set of time periods that interleave consecutive time periods in the first set of time periods, and wherein time periods in the third set of time periods have either fixed periods of time or are dynamically adjusted based on data about the vehicle and data about an environment surrounding the vehicle.

2. The vehicle as in claim 1 wherein the time periods in the first set are interleaved with time periods in the second set of time periods with no gaps in time between any of the time periods.

3. The vehicle as in claim 1 wherein time periods in the third set are decreased as the vehicle's speed increases and are increased as the vehicle's speed decreases.

4. The vehicle as in claim 3 wherein at least one of the time periods in the first set of time periods is different in duration than at least one of the time periods in the second set of time periods.

5. The vehicle as in claim 1 wherein at least one of the first LIDAR system or the second LIDAR system dynamically adjust power consumption levels when the time periods in the third set of time periods are dynamically adjusted.

6. A vehicle comprising:
a first LIDAR system to generate a first set of LIDAR data for a first field of view captured during a first set of time periods;
a second LIDAR system to generate a second set of LIDAR data for a second field of view captured during a second set of time periods, wherein the first set of time periods are different than the second set of time periods;
a data processing system coupled to the first LIDAR system and coupled to the second LIDAR system, the data processing system to process the first set of LIDAR data and to process the second set of LIDAR data, wherein for each time period in the first set of time periods and the second set of time periods only one of the first set of LIDAR data or the second set of LIDAR data is processed by the data processing system, wherein the first set of time periods and the second set of time periods cover different periods of time and wherein during any time period in which LIDAR data is available only one of the first set of LIDAR data or the second set of LIDAR data is ever fully processed and wherein durations of time periods in the first set of time periods and in the second set of time periods are dynamically adjusted based on data about the vehicle and data about the environment surrounding the vehicle.

7. A vehicle comprising:
a first LIDAR system to generate a first set of LIDAR data for a first field of view captured during a first set of time periods;
a second LIDAR system to generate a second set of LIDAR data for a second field of view captured during a second set of time periods, wherein the first set of time periods are different than the second set of time periods;
a data processing system coupled to the first LIDAR system and coupled to the second LIDAR system, the data processing system to process the first set of LIDAR data and to process the second set of LIDAR data, wherein for each time period in the first set of time periods and the second set of time periods only one of the first set of LIDAR data or the second set of LIDAR data is processed by the data processing system, wherein when the first LIDAR system malfunctions the second LIDAR system acts as a backup for the first LIDAR system and wherein the first field of view overlaps substantially with the second field of view, and wherein the second LIDAR system generates LIDAR data during the second set of time periods when the second LIDAR system acts as the backup, and wherein consecutive time periods in the first set of time periods are separated by a time period in the second set of time periods and wherein the data processing system does not process LIDAR data during a third set of time periods that interleave consecutive time periods in the first set of time periods and wherein time periods in the third set of time periods have dynamically adjusted periods of time based on data about the vehicle and an environment surrounding the vehicle.

8. A vehicle comprising:
a first LIDAR system to generate a first set of LIDAR data for a first field of view captured during a first set of time periods;
a second LIDAR system to generate a second set of LIDAR data for a second field of view captured during a second set of time periods, wherein the first set of time periods are different than and interleave in time the second set of time periods;
a data processing system coupled to the first LIDAR system and coupled to the second LIDAR system, the data processing system to process the first set of LIDAR data and to process the second set of LIDAR data, wherein during any time period in which LIDAR data is available the first set of LIDAR data, if available, and the second set of LIDAR data, if available, are processed differently, wherein during the any time period, only LIDAR data from one of the first set of LIDAR data and the second set of LIDAR data is processed and the other is not and wherein durations of time periods in the first set of time periods and in the second set of time periods are dynamically adjusted based on data about the vehicle and data about the environment surrounding the vehicle.

9. The vehicle as in claim 8 wherein during a time period in which LIDAR data is available from both the first LIDAR system and the second LIDAR system, data from the first LIDAR system is only partially processed to verify functionality of the first LIDAR system while data from the second LIDAR is processed to provide one or more of object recognition, object classification, object tracking or distance determination and wherein partial processing of data from the first LIDAR system is configured to determine whether the first LIDAR is malfunctioning.

10. The vehicle as in claim 9 wherein when the first LIDAR system is determined to be malfunctioning, the second LIDAR system acts as a backup for the first LIDAR system by providing LIDAR data during the first set of time periods.

11. A non-transitory machine readable medium storing executable program instructions which when executed by a data processing system cause the data processing system in a vehicle to perform a method comprising:
receiving, from a first LIDAR system, a first set of LIDAR data for a first field of view captured during a first set of time periods;
receiving, from a second LIDAR system, a second set of LIDAR data for a second field of view captured during a second set of time periods, where the first set of time periods are different than and interleave in time the second set of time periods;
processing the first set of LIDAR data and processing the second set of LIDAR data, wherein for each time period in the first set of time periods and in the second set of time periods only one of the first set of LIDAR data or the second set of LIDAR data is processed, wherein the processing of the first set and the second set of LIDAR data includes one or more of object recognition, object classification, object tracking, or distance determination, wherein consecutive time periods in the first set of time periods are separated by one of the time periods in the second set of time periods, and wherein the data processing system does not process LIDAR data during a third set of time periods that interleave consecutive time periods in the first set of time periods where time periods in the third set of time periods have either fixed periods of time or are dynamically adjusted based on data about the vehicle and data about an environment surrounding the vehicle.

12. The medium as in claim 11 wherein when the first LIDAR malfunctions the second LIDAR system acts as a backup for the first LIDAR system and wherein the first field of view overlaps substantially with the second field of view.

13. The medium as in claim 12 wherein the time periods in the first set of time periods are interleaved with time periods in the second set of time periods with no gaps in time between the time periods.

14. The medium as in claim 11 wherein time periods in the third set of time periods are decreased as the vehicle's speed increases and are increased as the vehicle's speed decreases.

15. The medium as in claim 14 wherein at least one of the first LIDAR system or the second LIDAR system dynamically adjust power consumption levels when the time periods in the third set of time periods are dynamically adjusted.

16. A vehicle comprising:
a first LIDAR system to generate a first set of LIDAR data for a first field of view captured during a first set of time periods;
a data processing system coupled to the first LIDAR system to process the first set of LIDAR data, wherein the first set of time periods are not consecutive in time and are interleaved by a second set of time periods from which no LIDAR data from the first LIDAR system is processed, wherein time periods in the second set of time periods have either fixed periods of time or are dynamically adjusted based on data about the vehicle and data about an environment surrounding the vehicle and wherein durations of time periods in the first set of time periods are dynamically adjusted based on data about the vehicle and data about an environment surrounding the vehicle.

17. The vehicle as in claim 16 wherein the time periods in the second set of time periods are decreased as the vehicle's speed increases and are increased as the vehicle's speed decreases.

18. The vehicle as in claim 16 wherein at least one of the first LIDAR system or the data processing system dynamically adjust power consumption levels when the time periods in the second set of time periods are dynamically adjusted.

19. The vehicle as in claim 16 wherein time periods in the first set of time periods are lengthened as vehicle speed increases or as traffic density increases.

* * * * *